United States Patent
Boykin

(10) Patent No.: US 10,152,859 B2
(45) Date of Patent: Dec. 11, 2018

(54) SYSTEMS, APPARATUSES AND METHODS FOR MULTIPLEXING AND SYNCHRONIZING AUDIO RECORDINGS

(71) Applicant: COBAN Technologies, Inc., Houston, TX (US)

(72) Inventor: Terry W. Boykin, Katy, TX (US)

(73) Assignee: COBAN TECHNOLOGIES, INC., Houston, TX (US)

( * ) Notice: Subject to any disclaimer, the term of this patent is extended or adjusted under 35 U.S.C. 154(b) by 0 days.

(21) Appl. No.: 15/438,166

(22) Filed: Feb. 21, 2017

(65) Prior Publication Data

US 2017/0323663 A1   Nov. 9, 2017

Related U.S. Application Data

(60) Provisional application No. 62/333,818, filed on May 9, 2016.

(51) Int. Cl.
*G06F 17/00* (2006.01)
*G08B 13/196* (2006.01)
(Continued)

(52) U.S. Cl.
CPC ....... *G08B 13/19613* (2013.01); *G06F 3/165* (2013.01); *G06K 9/00771* (2013.01); *G08B 13/19621* (2013.01); *G08B 13/19641* (2013.01); *G08B 13/19656* (2013.01); *G11B 20/10527* (2013.01); *G11B 27/10* (2013.01); *H04N 1/00* (2013.01); *H04N 5/2251* (2013.01); *H04N 5/232* (2013.01); *H04N 21/2368* (2013.01); *H04N 21/2743* (2013.01); *H04N 21/4223* (2013.01); *H04N 21/4302* (2013.01); *H04N 21/435* (2013.01); *H04N 21/4394* (2013.01); *H04N 21/8106* (2013.01);
(Continued)

(58) Field of Classification Search
CPC .......... G11B 27/10; G11B 2020/10546; G11B 20/10527; G11B 27/105; H04N 21/2368; H04N 21/2743; H04N 21/4302; H04N 21/435; H04N 21/4394; H04N 21/8106; H04N 21/84; G06F 3/165
See application file for complete search history.

(56) References Cited

U.S. PATENT DOCUMENTS 4,344,184 A   8/1982   Edwards
4,543,665 A   9/1985   Sotelo et al.
(Continued)

FOREIGN PATENT DOCUMENTS

CN   2907145 Y   5/2007
CN   101309088 A   11/2008
(Continued)

OTHER PUBLICATIONS

Office Action issued in U.S. Appl. No. 15/413,205 dated Mar. 17, 2017, 7 pages.
(Continued)

*Primary Examiner* — Fan Tsang
*Assistant Examiner* — David Siegel
(74) *Attorney, Agent, or Firm* — JL Salazar Law Firm

(57) ABSTRACT

Techniques for multiplexing audio recordings. Systems and methods for multiplexing and synchronizing audio recordings using data markers in the recorded files.

30 Claims, 6 Drawing Sheets

(51) Int. Cl.
*G06K 9/00* (2006.01)
*G06F 3/16* (2006.01)
*G11B 20/10* (2006.01)
*G11B 27/10* (2006.01)
*H04N 21/2368* (2011.01)
*H04N 21/2743* (2011.01)
*H04N 21/43* (2011.01)
*H04N 21/435* (2011.01)
*H04N 21/439* (2011.01)
*H04N 21/81* (2011.01)
*H04N 21/84* (2011.01)
*H04N 1/00* (2006.01)
*H04N 5/225* (2006.01)
*H04N 5/232* (2006.01)
*H04N 21/4223* (2011.01)
*H04R 3/00* (2006.01)

(52) U.S. Cl.
CPC ............. *H04N 21/84* (2013.01); *H04R 3/005* (2013.01); *G06K 2009/00738* (2013.01); *G11B 2020/10546* (2013.01); *H04S 2400/15* (2013.01)

(56) References Cited

U.S. PATENT DOCUMENTS

| | | |
|---|---|---|
| 4,590,614 A | 5/1986 | Erat |
| 4,910,795 A | 3/1990 | McCowen et al. |
| 5,012,335 A | 4/1991 | Cohodar |
| 5,111,289 A | 5/1992 | Lucas et al. |
| 5,408,330 A | 4/1995 | Squicciarini et al. |
| 5,477,397 A | 12/1995 | Naimpally et al. |
| 5,613,032 A | 3/1997 | Cruz et al. |
| 5,724,475 A | 3/1998 | Kirsten |
| 5,815,093 A | 9/1998 | Kikinis |
| 5,841,978 A | 11/1998 | Rhoads |
| 5,862,260 A | 1/1999 | Rhoads |
| 5,926,218 A | 7/1999 | Smith |
| 5,946,343 A | 8/1999 | Schotz et al. |
| 5,970,098 A | 10/1999 | Herzberg |
| 6,002,326 A | 12/1999 | Turner |
| 6,009,229 A | 12/1999 | Kawamura |
| 6,028,528 A | 2/2000 | Lorenzetti et al. |
| 6,038,257 A | 3/2000 | Brusewitz et al. |
| 6,122,403 A | 9/2000 | Rhoads |
| 6,141,611 A | 10/2000 | Mackey et al. |
| 6,163,338 A | 12/2000 | Johnson et al. |
| 6,175,860 B1 | 1/2001 | Gaucher |
| 6,181,711 B1 | 1/2001 | Zhang et al. |
| 6,275,773 B1 | 8/2001 | Lemelson et al. |
| 6,298,290 B1 | 10/2001 | Abe et al. |
| 6,346,965 B1 | 2/2002 | Toh |
| 6,405,112 B1 | 6/2002 | Rayner |
| 6,411,874 B2 | 6/2002 | Morgan et al. |
| 6,421,080 B1 | 7/2002 | Lambert |
| 6,424,820 B1 | 7/2002 | Burdick et al. |
| 6,462,778 B1 | 10/2002 | Abram et al. |
| 6,505,160 B1 | 1/2003 | Levy et al. |
| 6,510,177 B1 | 1/2003 | De Bonet et al. |
| 6,518,881 B2 | 2/2003 | Monroe |
| 6,624,611 B2 | 9/2003 | Kirmuss |
| 6,778,814 B2 | 8/2004 | Koike |
| 6,788,338 B1 | 9/2004 | Dinev et al. |
| 6,788,983 B2 | 9/2004 | Zheng |
| 6,789,030 B1 | 9/2004 | Coyle et al. |
| 6,791,922 B2 | 9/2004 | Suzuki |
| 6,825,780 B2 | 11/2004 | Saunders et al. |
| 6,831,556 B1 | 12/2004 | Boykin |
| 7,010,328 B2 | 3/2006 | Kawasaki et al. |
| 7,091,851 B2 | 8/2006 | Mason et al. |
| 7,119,832 B2 | 10/2006 | Blanco et al. |
| 7,120,477 B2 | 10/2006 | Huang |
| 7,155,615 B1 | 12/2006 | Silvester |
| 7,167,519 B2 | 1/2007 | Comaniciu et al. |
| 7,190,882 B2 | 3/2007 | Gammenthaler |
| 7,231,233 B2 | 6/2007 | Gosieski, Jr. |
| 7,272,179 B2 | 9/2007 | Siemens et al. |
| 7,317,837 B2 | 1/2008 | Yatabe et al. |
| 7,356,473 B2 | 4/2008 | Kates |
| 7,386,219 B2 | 6/2008 | Ishige |
| 7,410,371 B2 | 8/2008 | Shabtai et al. |
| 7,414,587 B2 | 8/2008 | Stanton |
| 7,428,314 B2 | 9/2008 | Henson |
| 7,515,760 B2 | 4/2009 | Sai et al. |
| 7,542,813 B2 | 6/2009 | Nam |
| 7,551,894 B2 | 6/2009 | Gerber et al. |
| 7,554,587 B2 | 6/2009 | Shizukuishi |
| 7,618,260 B2 | 11/2009 | Daniel et al. |
| 7,631,195 B1 | 12/2009 | Yu et al. |
| 7,688,203 B2 | 3/2010 | Rockefeller et al. |
| 7,693,289 B2 | 4/2010 | Stathem et al. |
| 7,768,548 B2 | 8/2010 | Silvernail et al. |
| 7,778,601 B2 | 8/2010 | Seshadri et al. |
| 7,792,189 B2 | 9/2010 | Finizio et al. |
| 7,818,078 B2 | 10/2010 | Iriarte |
| 7,835,530 B2 | 11/2010 | Avigni |
| 7,868,912 B2 | 1/2011 | Venetianer et al. |
| 7,877,115 B2 | 1/2011 | Seshadri et al. |
| 7,974,429 B2 | 7/2011 | Tsai |
| 7,995,652 B2 | 8/2011 | Washington |
| 8,068,023 B2 | 11/2011 | Dulin et al. |
| 8,081,214 B2 | 12/2011 | Vanman et al. |
| 8,086,277 B2 | 12/2011 | Ganley et al. |
| 8,121,306 B2 | 2/2012 | Cilia et al. |
| 8,126,276 B2 | 2/2012 | Bolle et al. |
| 8,126,968 B2 | 2/2012 | Rodman et al. |
| 8,139,796 B2 | 3/2012 | Nakashima et al. |
| 8,144,892 B2 | 3/2012 | Shemesh et al. |
| 8,145,134 B2 | 3/2012 | Henry et al. |
| 8,150,089 B2 | 4/2012 | Segawa et al. |
| 8,154,666 B2 | 4/2012 | Mody |
| 8,166,220 B2 | 4/2012 | Ben Yacov et al. |
| 8,174,577 B2 | 5/2012 | Chou |
| 8,195,145 B2 | 6/2012 | Angelhag |
| 8,208,024 B2 | 6/2012 | Dischinger |
| 8,228,364 B2 | 7/2012 | Cilia |
| 8,230,149 B1 | 7/2012 | Long et al. |
| 8,253,796 B2 | 8/2012 | Renkis |
| 8,254,844 B2 | 8/2012 | Kuffner et al. |
| 8,260,217 B2 | 9/2012 | Chang et al. |
| 8,264,540 B2 | 9/2012 | Chang et al. |
| 8,270,647 B2 | 9/2012 | Crawford et al. |
| 8,289,370 B2 | 10/2012 | Civanlar et al. |
| 8,300,863 B2 | 10/2012 | Knudsen et al. |
| 8,311,549 B2 | 11/2012 | Chang et al. |
| 8,311,983 B2 | 11/2012 | Guzik |
| 8,358,980 B2 | 1/2013 | Tajima et al. |
| 8,380,131 B2 | 2/2013 | Chiang |
| 8,422,944 B2 | 4/2013 | Flygh et al. |
| 8,446,469 B2 | 5/2013 | Blanco et al. |
| 8,457,827 B1 | 6/2013 | Ferguson et al. |
| 8,489,065 B2 | 7/2013 | Green et al. |
| 8,489,151 B2 | 7/2013 | Engelen et al. |
| 8,497,940 B2 | 7/2013 | Green et al. |
| 8,554,145 B2 | 10/2013 | Fehr |
| 8,612,708 B2 | 12/2013 | Drosch |
| 8,630,908 B2 | 1/2014 | Forster |
| 8,661,507 B1 | 2/2014 | Hesselink et al. |
| 8,707,392 B2 | 4/2014 | Birtwhistle et al. |
| 8,731,742 B2 | 5/2014 | Zagorski et al. |
| 8,780,199 B2 | 7/2014 | Mimar |
| 8,781,292 B1 | 7/2014 | Ross et al. |
| 8,849,557 B1 | 9/2014 | Levandowski et al. |
| 9,041,803 B2 | 5/2015 | Chen et al. |
| 9,070,289 B2 | 6/2015 | Saund et al. |
| 9,159,371 B2 | 10/2015 | Ross et al. |
| 9,201,842 B2 | 12/2015 | Plante |
| 9,225,527 B1 | 12/2015 | Chang |
| 9,253,452 B2 | 2/2016 | Ross et al. |
| 9,307,317 B2 | 4/2016 | Chang et al. |
| 9,325,950 B2 | 4/2016 | Haler |
| 9,471,059 B1 | 10/2016 | Wilkins |

(56) References Cited

U.S. PATENT DOCUMENTS

| | | |
|---|---|---|
| 9,589,448 B1 | 3/2017 | Schneider et al. |
| 9,665,094 B1 | 5/2017 | Russell |
| 10,074,394 B2 | 9/2018 | Ross et al. |
| 2002/0003571 A1 | 1/2002 | Schofield et al. |
| 2002/0051061 A1 | 5/2002 | Peters et al. |
| 2002/0135679 A1 | 9/2002 | Scaman |
| 2003/0052970 A1 | 3/2003 | Dodds et al. |
| 2003/0080878 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0103140 A1 | 6/2003 | Watkins |
| 2003/0151663 A1 | 8/2003 | Lorenzetti et al. |
| 2003/0197629 A1 | 10/2003 | Saunders et al. |
| 2004/0008255 A1 | 1/2004 | Lewellen |
| 2004/0051793 A1 | 3/2004 | Tecu et al. |
| 2004/0107030 A1 | 6/2004 | Nishira et al. |
| 2004/0146272 A1 | 7/2004 | Kessel et al. |
| 2004/0177253 A1 | 9/2004 | Wu et al. |
| 2005/0007458 A1 | 1/2005 | Benattou |
| 2005/0078195 A1 | 4/2005 | VanWagner |
| 2005/0083404 A1 | 4/2005 | Pierce et al. |
| 2005/0088521 A1 | 4/2005 | Blanco et al. |
| 2005/0122397 A1 | 6/2005 | Henson et al. |
| 2005/0154907 A1 | 7/2005 | Han et al. |
| 2005/0158031 A1 | 7/2005 | David |
| 2005/0185936 A9 | 8/2005 | Lao et al. |
| 2005/0243171 A1 | 11/2005 | Ross, Sr. et al. |
| 2005/0286476 A1 | 12/2005 | Crosswy et al. |
| 2006/0055521 A1 | 3/2006 | Blanco et al. |
| 2006/0072672 A1 | 4/2006 | Holcomb et al. |
| 2006/0077256 A1 | 4/2006 | Silvemail et al. |
| 2006/0078046 A1 | 4/2006 | Lu |
| 2006/0130129 A1 | 6/2006 | Dai et al. |
| 2006/0133476 A1 | 6/2006 | Page et al. |
| 2006/0165386 A1 | 7/2006 | Garoutte |
| 2006/0270465 A1 | 11/2006 | Lee et al. |
| 2006/0274116 A1 | 12/2006 | Wu |
| 2007/0005609 A1 | 1/2007 | Breed |
| 2007/0064108 A1 | 3/2007 | Haler |
| 2007/0086601 A1 | 4/2007 | Mitchler |
| 2007/0111754 A1 | 5/2007 | Marshall et al. |
| 2007/0124292 A1 | 5/2007 | Kirshenbaum et al. |
| 2007/0217761 A1 | 9/2007 | Chen et al. |
| 2007/0219685 A1 | 9/2007 | Plante |
| 2008/0005472 A1 | 1/2008 | Khalidi et al. |
| 2008/0030782 A1 | 2/2008 | Watanabe |
| 2008/0129825 A1 | 6/2008 | DeAngelis et al. |
| 2008/0165250 A1 | 7/2008 | Ekdahl et al. |
| 2008/0186129 A1 | 8/2008 | Fitzgibbon |
| 2008/0208755 A1 | 8/2008 | Malcolm |
| 2008/0294315 A1 | 11/2008 | Breed |
| 2008/0303903 A1 | 12/2008 | Bentley et al. |
| 2009/0017881 A1 | 1/2009 | Madrigal |
| 2009/0022362 A1 | 1/2009 | Gagvani et al. |
| 2009/0074216 A1 | 3/2009 | Bradford et al. |
| 2009/0076636 A1 | 3/2009 | Bradford et al. |
| 2009/0118896 A1 | 5/2009 | Gustafsson |
| 2009/0195651 A1 | 8/2009 | Leonard et al. |
| 2009/0195655 A1 | 8/2009 | Pandey |
| 2009/0213902 A1 | 8/2009 | Jeng |
| 2010/0026809 A1 | 2/2010 | Curry |
| 2010/0030929 A1 | 2/2010 | Ben-Yacov et al. |
| 2010/0057444 A1 | 3/2010 | Cilia |
| 2010/0081466 A1 | 4/2010 | Mao |
| 2010/0131748 A1 | 5/2010 | Lin |
| 2010/0136944 A1 | 6/2010 | Taylor et al. |
| 2010/0180051 A1 | 7/2010 | Harris |
| 2010/0238009 A1 | 9/2010 | Cook et al. |
| 2010/0274816 A1 | 10/2010 | Guzik |
| 2010/0287545 A1 | 11/2010 | Corbefin |
| 2010/0289648 A1 | 11/2010 | Ree |
| 2010/0302979 A1 | 12/2010 | Reunamaki |
| 2010/0309971 A1 | 12/2010 | Vanman et al. |
| 2011/0016256 A1 | 1/2011 | Hatada |
| 2011/0044605 A1 | 2/2011 | Vanman et al. |
| 2011/0092248 A1 | 4/2011 | Evanitsky |
| 2011/0142156 A1 | 6/2011 | Haartsen |
| 2011/0233078 A1 | 9/2011 | Monaco et al. |
| 2011/0234379 A1 | 9/2011 | Lee |
| 2011/0280143 A1 | 11/2011 | Li et al. |
| 2011/0280413 A1 | 11/2011 | Wu et al. |
| 2011/0299457 A1 | 12/2011 | Green, III et al. |
| 2012/0014534 A1 | 1/2012 | Bodley et al. |
| 2012/0078397 A1 | 3/2012 | Lee et al. |
| 2012/0083960 A1 | 4/2012 | Zhu et al. |
| 2012/0119894 A1 | 5/2012 | Pandy |
| 2012/0163309 A1 | 6/2012 | Ma et al. |
| 2012/0173577 A1 | 7/2012 | Millar et al. |
| 2012/0266251 A1 | 10/2012 | Birtwhistle et al. |
| 2012/0300081 A1 | 11/2012 | Kim |
| 2012/0307070 A1 | 12/2012 | Pierce |
| 2012/0310394 A1 | 12/2012 | El-Hoiydi |
| 2012/0310395 A1 | 12/2012 | El-Hoiydi |
| 2013/0114849 A1 | 5/2013 | Pengelly et al. |
| 2013/0135472 A1 | 5/2013 | Wu et al. |
| 2013/0163822 A1 | 6/2013 | Chigos et al. |
| 2013/0201884 A1 | 8/2013 | Freda et al. |
| 2013/0218427 A1 | 8/2013 | Mukhopadhyay et al. |
| 2013/0223653 A1 | 8/2013 | Chang |
| 2013/0236160 A1 | 9/2013 | Gentile et al. |
| 2013/0242262 A1 | 9/2013 | Lewis |
| 2013/0251173 A1 | 9/2013 | Ejima et al. |
| 2013/0268357 A1 | 10/2013 | Heath |
| 2013/0287261 A1 | 10/2013 | Lee et al. |
| 2013/0302758 A1 | 11/2013 | Wright |
| 2013/0339447 A1 | 12/2013 | Ervine |
| 2013/0346660 A1 | 12/2013 | Kwidzinski et al. |
| 2014/0037142 A1 | 2/2014 | Bhanu et al. |
| 2014/0038668 A1 | 2/2014 | Vasavada et al. |
| 2014/0078304 A1 | 3/2014 | Othmer |
| 2014/0085475 A1 | 3/2014 | Bhanu et al. |
| 2014/0092251 A1 | 4/2014 | Troxel |
| 2014/0100891 A1 | 4/2014 | Turner et al. |
| 2014/0114691 A1 | 4/2014 | Pearce |
| 2014/0143545 A1 | 5/2014 | McKeeman et al. |
| 2014/0162598 A1 | 6/2014 | Villa-Real |
| 2014/0184796 A1* | 7/2014 | Klein ............... H04N 21/41422 348/148 |
| 2014/0236414 A1 | 8/2014 | Droz et al. |
| 2014/0236472 A1 | 8/2014 | Rosario |
| 2014/0278052 A1 | 9/2014 | Slavin et al. |
| 2014/0280584 A1 | 9/2014 | Ervine |
| 2014/0281498 A1 | 9/2014 | Bransom et al. |
| 2014/0297687 A1 | 10/2014 | Lin |
| 2014/0309849 A1 | 10/2014 | Ricci |
| 2014/0321702 A1 | 10/2014 | Schmalstieg |
| 2014/0355951 A1* | 12/2014 | Tabak ................... G11B 27/10 386/241 |
| 2014/0375807 A1 | 12/2014 | Muetzel et al. |
| 2015/0012825 A1 | 1/2015 | Rezvani et al. |
| 2015/0032535 A1 | 1/2015 | Li et al. |
| 2015/0066349 A1 | 3/2015 | Chan et al. |
| 2015/0084790 A1 | 3/2015 | Arpin et al. |
| 2015/0086175 A1* | 3/2015 | Lorenzetti ............ H04N 9/8211 386/226 |
| 2015/0088335 A1 | 3/2015 | Lambert et al. |
| 2015/0103159 A1 | 4/2015 | Shashua et al. |
| 2015/0161483 A1 | 6/2015 | Allen et al. |
| 2015/0211868 A1 | 7/2015 | Matsushita et al. |
| 2015/0266575 A1 | 9/2015 | Borko |
| 2015/0294174 A1 | 10/2015 | Karkowski et al. |
| 2016/0023762 A1 | 1/2016 | Wang |
| 2016/0035391 A1 | 2/2016 | Ross et al. |
| 2016/0042767 A1 | 2/2016 | Araya et al. |
| 2016/0062762 A1 | 3/2016 | Chen et al. |
| 2016/0062992 A1 | 3/2016 | Chen et al. |
| 2016/0063642 A1 | 3/2016 | Luciani et al. |
| 2016/0064036 A1 | 3/2016 | Chen et al. |
| 2016/0065908 A1 | 3/2016 | Chang et al. |
| 2016/0144788 A1 | 5/2016 | Perrin et al. |

(56) References Cited

U.S. PATENT DOCUMENTS

| | | | |
|---|---|---|---|
| 2016/0148638 A1 | 5/2016 | Ross et al. | |
| 2016/0285492 A1 | 9/2016 | Vembar et al. | |
| 2016/0332747 A1* | 11/2016 | Bradlow | B64D 47/08 |
| 2017/0032673 A1 | 2/2017 | Scofield et al. | |
| 2017/0053169 A1 | 2/2017 | Cuban et al. | |
| 2017/0053674 A1* | 2/2017 | Fisher | H04N 21/84 |
| 2017/0059265 A1 | 3/2017 | Winter et al. | |
| 2017/0066374 A1 | 3/2017 | Hoye | |
| 2017/0076396 A1 | 3/2017 | Sudak | |
| 2017/0085829 A1 | 3/2017 | Waniguchi et al. | |
| 2017/0113664 A1 | 4/2017 | Nix | |
| 2017/0178422 A1 | 6/2017 | Wright | |
| 2017/0178423 A1 | 6/2017 | Wright | |
| 2017/0193828 A1 | 7/2017 | Holtzman et al. | |
| 2017/0253330 A1 | 9/2017 | Saigh et al. | |
| 2017/0324897 A1 | 11/2017 | Swaminathan et al. | |

FOREIGN PATENT DOCUMENTS

| | | |
|---|---|---|
| CN | 102355618 A | 2/2012 |
| CN | 102932703 A | 2/2013 |
| CN | 202957973 U | 5/2013 |
| CN | 103617005 A | 3/2014 |
| EP | 1148726 A2 | 10/2001 |
| EP | 1655855 A1 | 5/2006 |
| EP | 2107837 A1 | 10/2009 |
| GB | 2391687 A | 11/2004 |
| JP | 2003150450 A | 5/2003 |
| JP | 2005266934 A | 9/2005 |
| JP | 2009169922 A | 7/2009 |
| JP | 2012058832 A | 3/2012 |
| WO | 1997038526 A1 | 10/1997 |
| WO | 2000013410 A1 | 3/2000 |
| WO | 2000021258 A1 | 4/2000 |
| WO | 2000045587 A2 | 8/2000 |
| WO | 2000072186 A2 | 11/2000 |
| WO | 2002061955 A2 | 8/2002 |
| WO | 2004066590 A2 | 8/2004 |
| WO | 2004111851 A | 12/2004 |
| WO | 2005053325 A2 | 6/2005 |
| WO | 2005054997 A2 | 6/2005 |
| WO | 2007114988 | 10/2007 |
| WO | 2009058611 A1 | 5/2009 |
| WO | 2009148374 A1 | 12/2009 |
| WO | 2012001143 A1 | 1/2012 |
| WO | 2012100114 A2 | 7/2012 |
| WO | 2012116123 A2 | 8/2012 |
| WO | 2013020588 A2 | 2/2013 |
| WO | 2013074947 A2 | 5/2013 |
| WO | 2013106740 A2 | 7/2013 |
| WO | 2013107516 A1 | 7/2013 |
| WO | 2013150326 A1 | 10/2013 |
| WO | 2014057496 A2 | 4/2014 |
| WO | 2016033523 A1 | 3/2016 |
| WO | 2016061516 A1 | 4/2016 |
| WO | 2016061525 A1 | 4/2016 |
| WO | 2016061533 A1 | 4/2016 |

OTHER PUBLICATIONS

Office Action issued in U.S. Appl. No. 11/369,502 dated Mar. 16, 2010, 10 pages.
Office Action issued in U.S. Appl. No. 11/369,502 dated Sep. 30, 2010, 12 pages.
Office Action issued in U.S. Appl. No. 11/369,502 dated Jul. 14, 2011, 17 pages.
Office Action issued in U.S. Appl. No. 11/369,502 dated Jan. 31, 2012, 18 pages.
Examiner's Answer (to Appeal Brief) issued in U.S. Appl. No. 11/369,502 dated Oct. 24, 2012, 20 pages.
Office Action issued in U.S. Appl. No. 13/723,747 dated Mar. 22, 2013, 6 pages.
Office Action issued in U.S. Appl. No. 13/723,747 dated Jun. 26, 2013, 6 pages.
Office Action issued in U.S. Appl. No. 13/723,747 dated Sep. 10, 2013, 7 pages.
Advisory Action issued in U.S. Appl. No. 13/723,747 dated Feb. 24, 2014, 4 pages.
Office Action issued in U.S. Appl. No. 13/723,747 dated Mar. 20, 2014, 6 pages.
Office Action issued in U.S. Appl. No. 13/723,747 dated Nov. 10, 2014, 9 pages.
Notice of Allowance and Fees Due issued in U.S. Appl. No. 13/723,747 dated Mar. 30, 2015, 6 pages.
First Action Interview Pilot Program Pre-Interview Communication issued in U.S. Appl. No. 14/588,139 dated May 14, 2015, 4 pages.
Office Action issued in U.S. Appl. No. 14/593,853 dated Apr. 20, 2015, 30 pages.
Office Action issued in U.S. Appl. No. 14/593,956 dated May 6, 2015, 10 pages.
PCT International Search Report and Written Opinion issued in Application No. PCT/US07/63485 dated Feb. 8, 2008, 10 pages.
Chapter 5: "Main Memory," Introduction to Computer Science course, 2004, 20 pages, available at http://www2.cs.ucy.ac.cy/~nicolast/courses/lectures/MainMemory.pdf.
Sony Corporation, Digital Still Camera (MVC-CD200/CD300), Operation Manual, 2001, 108 pages, Sony, Japan.
Steve'S Digicams, Kodak Professional DCS 620 Digital Camera, 1999, 11 pages, United States, available at: http://www.steves-digicams.com/dcs620.html.
Gregory J. Allen, "The Feasibility of Implementing Video Teleconferencing Systems Aboard Afloat Naval Units" (Master's Thesis, Naval Postgraduate School, Monterey, California), Mar. 1990, 143 pages.
Bell-Northern Research Ltd., "A Multi-Bid Rate Interframe Movement Compensated Multimode Coder for Video Conferencing" (Final Report prepared for DARPA), Apr. 1982, 92 pages, Ottawa, Ontario, Canada.
Xiaoqing Zhu, Eric Setton, Bernd Girod, "Rate Allocation for Multi-Camera Surveillance Over an Ad Hoc Wireless Network," 2004, 6 pages, available at http://msw3.stanford.edu/~zhuxq/papers/pcs2004.pdf.
Office Action issued in U.S. Appl. No. 14/593,722 dated Sep. 25, 2015, 39 pages.
Office Action issued in U.S. Appl. No. 14/593,853 dated Sep. 11, 2015 (including Summary of Interview conducted on May 9, 2015), 45 pages.
Notice of Allowance issued in U.S. Appl. No. 14/593,956 dated Oct. 26, 2015, 10 pages.
"IEEE 802.1X," Wikipedia, Aug. 23, 2013, 8 pages, available at: http://en.wikipedia.org/w/index.php?title=IEEE_802.1X&oldid=569887090.
Notice of Allowance issued in U.S. Appl. No. 14/588,139 dated Aug. 14, 2015, 19 pages.
"Near Field Communication," Wikipedia, Jul. 19, 2014, 8 pages, available at: https://en.wikipedia.org/w/index.php?title=near_field_communication&oldid=617538619.
PCT International Search Report and Written Opinion issued in Application No. PCT/US15/47532 dated Jan. 8, 2016, 22 pages.
Office Action issued in U.S. Appl. No. 14/686,192 dated Apr. 8, 2016, 19 pages.
Office Action issued in U.S. Appl. No. 14/715,742 dated Aug. 21, 2015, 13 pages.
Office Action issued in U.S. Appl. No. 14/715,742 dated Mar. 11, 2016, 14 pages.
Office Action issued in U.S. Appl. No. 14/593,722 dated Apr. 10, 2015, 28 pages.
Office Action issued in U.S. Appl. No. 14/686,192 dated Dec. 24, 2015, 12 pages.
"Portable Application," Wikipedia, Jun. 26, 2014, 4 pages, available at: http://en.wikipedia.org/w/index.php?title=Portable_application&oldid=614543759.
"Radio-Frequency Identification," Wikipedia, Oct. 18, 2013, 31 pages, available at: http://en.wikipedia.org/w/index.php?title=Radio-frequency_identification&oldid=577711262.

(56) References Cited

OTHER PUBLICATIONS

Advisory Action issued in U.S. Appl. No. 14/715,742 dated May 20, 2016 (including Summary of Interview conducted on May 12, 2016), 4 pages.
Advisory Action issued in U.S. Appl. No. 14/715,742 dated Jun. 14, 2016, 3 pages.
Office Action issued in U.S. Appl. No. 14/715,742 dated Sep. 23, 2016, 17 pages.
Office Action issued in U.S. Appl. No. 15/412,044 dated Jun. 1, 2017, 10 pages.
Office Action issued in U.S. Appl. No. 15/467,924 dated May 8, 2017, 10 pages.

* cited by examiner

SYSTEMS, APPARATUSES AND METHODS FOR MULTIPLEXING AND SYNCHRONIZING AUDIO RECORDINGS

CROSS-REFERENCE TO RELATED APPLICATIONS

This application claims priority to U.S. Provisional Patent Application No. 62/333,818, filed on May 9, 2016, titled "Systems, Apparatuses and Methods for Creating, Identifying, Enhancing, and Distributing Evidentiary Data." The entire disclosure of Application No. 62/333,818 is hereby incorporated herein by reference.

STATEMENT REGARDING FEDERALLY SPONSORED RESEARCH

Not applicable.

TECHNICAL FIELD OF THE INVENTION

This disclosure relates generally to techniques for processing audio recordings. More particularly, but not by way of limitation, this disclosure relates to systems and methods for multiplexing and synchronizing audio recordings.

BACKGROUND

Today's law enforcement officers have various means of technology at their disposal to perform their tasks. However, while technology has provided law enforcement officers powerful tools to perform their jobs, it has also added a level of complexity for officers on patrol. Officers are typically burdened with having to wear and maintain various pieces of gear while on patrol. This gear weighs down the officer, and the electronic gear generates heat which creates discomfort, particularly in hot summer conditions. Recently, officers have begun to use body-worn-cameras (BWC) to capture on-scene video while on patrol.

The BWCs used by officers are often paired with a separate microphone to transmit on-scene audio. The captured audio is typically transmitted wirelessly to a receiver in the officer's patrol car. The transmission of the audio from the body-worn microphone to the patrol car is subject to signal interference and signal loss when out of range. These limitations can hinder the use of such audio collection for evidence in legal proceedings.

A need remains for consolidation of wearable equipment and improved techniques to collect, multiplex, and synchronize audio recordings for law enforcement purposes and other functions.

SUMMARY

In view of the aforementioned problems and trends, embodiments of the present invention provide systems and methods for multiplexing and synchronizing audio recordings.

According to an aspect of the invention, a method includes recording audio data using a first device, wherein the first device is portable, transferring the recorded audio data from the first device to a second device configured to receive audio data, and multiplexing the transferred audio data with at least one data file in the second device to synchronize the transferred audio data with the at least one data file.

According to another aspect of the invention, a system includes a first device configured to record audio data, wherein the first device is portable, and a second device configured: (a) to hold or store at least one data file, and (b) to receive audio data from the first device, wherein the second device is configured to multiplex audio data the second device receives from the first device with at least one data file held by the second device, to synchronize the received audio data with the at least one data file.

According to another aspect of the invention, a method includes recording audio data using a first device, wherein the first device is portable, transferring the recorded audio data from the first device to a second device containing at least one data file, detecting at least one marker in either of the transferred audio data or the at least one data file, and using the detected at least one marker, synchronizing the transferred audio data with the at least one data file.

According to another aspect of the invention, a method includes recording audio data using a first device, wherein the first device is portable, simultaneously with the recording audio data using the first device, wirelessly transmitting the recorded audio data from the first device to a second device configured to receive audio data, and recording the transmitted audio data using the second device.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

NOTATION AND NOMENCLATURE

Figure 1:
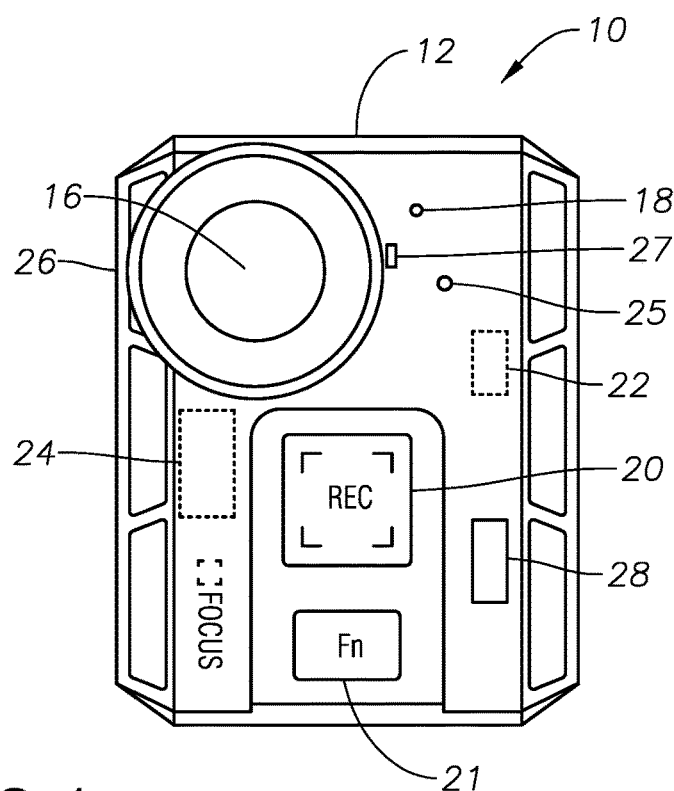
FIG. 1, in accordance with some embodiments of the present disclosure, depicts a portable camera device.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" (and the like) and "comprising" (and the like) are used in an open-ended fashion, and thus should be interpreted to mean "including, but not limited to . . . " Also, the term "couple," "coupled," or "linked" is intended to mean either an indirect or direct electrical, mechanical, or wireless connection. Thus, if a first device couples to or is linked to a second device, that connection may be through a direct electrical, mechanical, or wireless connection, or through an indirect electrical, mechanical, or wireless connection via other devices and connections.

As used throughout this disclosure the term "computer" encompasses special purpose microprocessor-based devices such as a digital video surveillance system primarily configured for executing a limited number of applications, and general purpose computers such as laptops, workstations, or servers which may be configured by a user to run any number of off the shelf or specially designed software applications. Computer systems and computer devices will generally interact in the same way with elements and aspects of disclosed embodiments. This disclosure also refers to memory or storage devices and storage drives interchangeably. In general, memory or a storage device/drive represents a medium accessible by a computer (via wired or wireless connection) to store data and computer program instructions. It will also be appreciated that use of the term "microprocessor" in this disclosure encompasses one or more processors.

As used throughout this disclosure the term "record" is interchangeable with the term "store" and refers to the retention of data in a storage medium designed for long-term retention (e.g., solid state memory, hard disk, CD, DVD, memory card, etc.), as compared to the temporary retention offered by conventional memory means such as volatile RAM. The temporary retention of data, audio data or otherwise, is referred to herein as the "holding" of data or as data being "held."

The terms "multiplex" and "multiplexing" refer to the incorporation or combination of a specified file, audio track (i.e. audio communication signal), and/or data with another file, audio track, or other data.

As used throughout this disclosure the terms "video data" and "visual data" refer to still image data, moving image data, or both still and moving image data, as traditionally understood. The term "audiovisual data" encompasses not only video or visual data but also audio data and/or metadata. That is, audiovisual data may include visual or video data, audio data, metadata, or any combination of these three. This audiovisual data may be compressed using industry standard compression technology (e.g., Motion Picture Expert Group (MPEG) standards, Audio Video Interleave (AVI), etc.) or another proprietary compression or storage format. The terms "camera," "camera device," and the like are understood to encompass devices configured to record or capture audiovisual data. Such devices may also be referred to as video recording devices, or the like. Metadata may be included in the files containing the audiovisual (or audio, or video) data or in separate, associated data files, that may be configured in a structured text format such as eXtensible Markup Language (XML).

The term "metadata" refers to information associated with the recording of audio, video, or audiovisual data, or information included in the recording of such data, and metadata may contain information describing attributes associated with one or more acts of actual recording of audio, video, or audiovisual data. That is, the metadata may describe who (e.g., officer ID) or what (e.g., manual or automatic trigger) initiated or performed the recording. The metadata may also describe where the recording was made. For example, location may be obtained using global positioning system (GPS) information. The metadata may also describe why the recording was made (e.g., event tag describing the nature of the subject matter recorded). The metadata may also describe when the recording was made, using timestamp information obtained in association with GPS information or from an internal clock, for example. Metadata may also include information relating to the device(s) used to capture or process information (e.g. a unit serial number, mac address, etc.). Metadata may also include telemetry or other types of data. From these types of metadata, circumstances that prompted the recording may be inferred and may provide additional information about the recorded information. This metadata may include useful information to correlate recordings from multiple distinct recording systems as disclosed herein. This type of correlation information may assist in many different functions (e.g., query, data retention, chain of custody, precise synchronization and so on).

As used throughout this disclosure the term "portable" refers to the ability to be easily carried or moved. The term encompasses a wearable device (i.e. a device that can be worn or carried by a person or an animal).

The term "cloud" refers to an area or environment generally accessible across a communication network (which may or may not be the Internet) that provides shared computer storage and/or processing resources and/or data to computers and other devices. A "cloud" may refer to a public cloud, private cloud, or combination of a public and private cloud (e.g., hybrid cloud). The term "public cloud" generally refers to a cloud storage environment or area that is maintained by an unrelated third party but still has certain security measures in place to ensure that access is only allowed to authorized users. The term "private cloud" generally refers to a cloud storage environment or area that is maintained by a related entity or that is maintained on physical computer resources that are separate from any unrelated users.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are necessarily described for each embodiment disclosed in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure. It will also be appreciated that the parts and component dimensions of the embodiments disclosed herein may not be drawn to scale.

FIG. 1 depicts an embodiment of a first device 10 in accordance with this disclosure. In this embodiment, the first device 10 comprises a portable wearable camera 12. The camera 12 is configured with a fixed-focus or auto-focus lens 16, a microphone 18, and a record activation button 20, which permits a user to manually activate or deactivate the camera 12 to record audiovisual data (i.e., audio data captured via the microphone 18 and video data captured via the lens 16). Some embodiments may be configured to allow for separate manual activation/deactivation of the microphone 18 (audio recording functionality) and lens 16 (video recording functionality), respectively, permitting a user to capture only audio data or only video data as desired. Thus, camera 12 is configurable/operable to record/store/hold solely audio data, solely video data, or a combination thereof, which may be referred to as audiovisual data; in all of these cases, camera 12 is also operable/configurable, but not required, to record/store/hold metadata. As described below, where audiovisual data is recorded/stored/held, this may be with or without a separate audio and/or video track. Some embodiments may also include a programmable function button 21 that provides a user the ability to select among different programmed/programmable modes of operation. The camera 12 may be configured with an internal buffer 22 (e.g. RAM) to temporarily hold captured audio, video and/or audiovisual data, and memory 24 (e.g. flash drive) to store captured audio, video and/or audiovisual data. The camera 12 may be configured to automatically create the respective data files (i.e. audio, video, audiovisual) as the data is captured/recorded. Some embodiments may also include an audio speaker 25 to provide voice messages and/or an audible indication during various modes of operation. For example, the speaker 25 may be configured for activation: when camera 12 recording starts or stops, to provide a camera low battery alert, to provide a camera memory full alert, to indicate successful camera pairing with another device, to provide warning beeps that may be sent from another device, etc. In some embodiments, the audible indication may indicate generically an event or may indicate the specific event (not merely that one of several types of events occurred). That is, different audible sounds (including voice messages) may be generated for respective different event types (e.g., one beep for event type x, two beeps for event type y; a buzzer sound for event type x, a ring tone for event type y, a voice message for event type z; a voice message for event type x, a different voice message for event type y; etc.). It will be appreciated by those skilled in the art that camera 12 embodiments of this disclosure can be implemented with various types of additional sensors to capture/store desired information (e.g. temperature) and with conventional data storage means as known in the art. Embodiments of the camera 12 are also equipped with internal Bluetooth® circuitry and associated electronics or other wireless technology to permit wireless communication and or signal transfer to or from the camera 12. Bluetooth® pairing may be manually activated by a button 26 on the camera 12. Some embodiments may also include a light-emitting diode (LED) 27 to indicate when the camera 12 is recording or performing other functions. Some embodiments are also equipped with Global Positioning System and real-time clock circuitry 28 to provide GPS data and current time information. Suitable camera devices 12 that may be used to implement embodiments of this disclosure include the devices commercially available from COBAN Technologies, Inc., in Houston, Tex. (http//www.cobantech.com).

Figure 2:
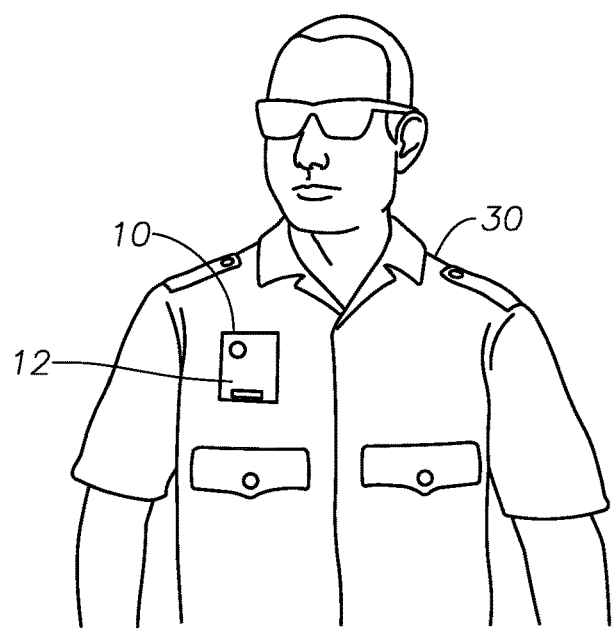
FIG. 2, in accordance with some embodiments of the present disclosure, depicts the portable camera device of FIG. 1 in use as a body-worn-camera.

FIG. 2 depicts the first device 10 camera 12 being worn by a user 30 (e.g. a police officer) as a BWC. This implementation provides a user the ability to capture on-scene audiovisual data with the camera 12. For law enforcement, the wearable camera 12 provides the officer complete freedom to move while the camera 12 records audio, video, or audiovisual data as desired. The audio, video, and/or audiovisual data is stored in the camera 12 memory 24. The camera 12 may be configured to automatically include metadata (e.g., time stamp, watermark, GPS data, unit ID, officer ID, unique identifier, etc.) in the data recorded.

In some embodiments, the first device 10 camera 12 may be configured to wirelessly sync (e.g., via Bluetooth®, RuBee, Wi-Fi, 3G, 4G, LTE, etc.) with other data gathering/telemetry devices within a set range or proximity. Such other devices may include, for example, biometric data sensors, geospatial, distancing and orientation data devices (apart from that provided by GPS), environmental telemetry devices, etc. In such embodiments, the camera 12 can wirelessly receive data transmitted from the other devices and store the data in memory 24 as metadata. The data from the other devices can be recorded in sync with the recording of audio/video or independently (e.g. when the camera 12 is not holding/storing audio/video). The camera 12 may be configured to sync with other devices automatically or via manual activation. All of this additional data from other devices can be multiplexed and synchronized with selected data using the techniques disclosed herein.

In some embodiments, the audio, video, and/or audiovisual data captured by the camera 12 is temporarily held in the buffer 22 in a continuous circulating stream to perform "pre-event" circular buffering, without storing the data to memory 24 until the camera 12 is activated to store the data to memory 24 by a wireless command or by manual activation via the record "on/off" button 20. This "smart buffering" feature provides a circular buffer that temporarily holds the captured data in configurable file segment sizes (e.g. 1-5 minute chunks) until activated to store the data to memory 24 or the data is automatically deleted as new data is captured and streamed into the buffer 22 in a continuous manner. When activated to store the data, time points are marked in the data files. In some embodiments, if the camera 12 is activated or triggered to store the data, the camera 12 can be configured to export the data (in the above-mentioned file segments) to a removable media and/or a separate folder in the memory 24 sector where the circular recording is written. In some embodiments, the pre-event buffering can optionally be configured to continually write directly to memory 24 in a circulating stream.

Figure 3:
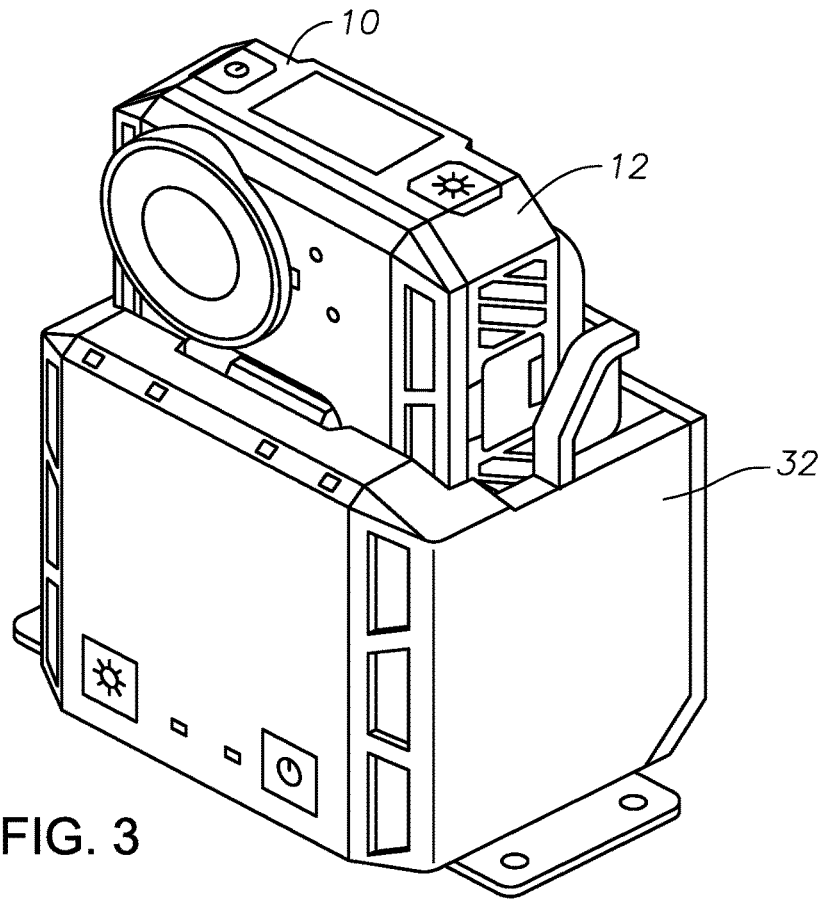
FIG. 3, in accordance with some embodiments of the present disclosure, depicts a schematic of a portable camera device docked in a docking module.

When not being worn, the camera 12 can be docked into a docking module 32, as depicted in FIG. 3. Suitable docking modules 32 that may be used to implement embodiments of this disclosure include the devices commercially available from COBAN Technologies, Inc., in Houston, Tex. (http//www.cobantech.com).

Figure 4:
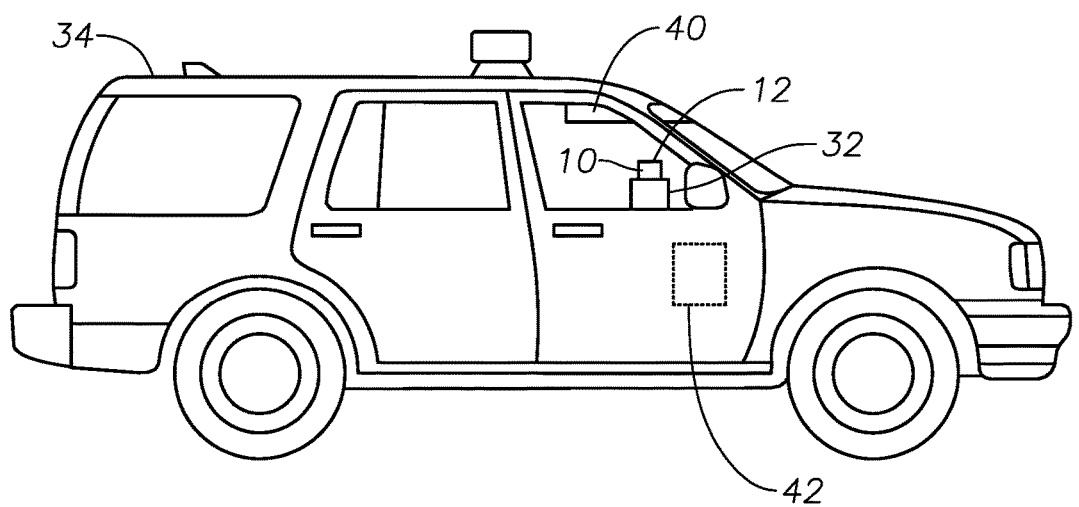
FIG. 4, in accordance with some embodiments of the present disclosure, depicts a vehicle with an onboard computer and camera devices.

For law enforcement applications, the docking module 32 can be mounted in a police vehicle 34, as depicted in FIG. 4. Embodiments can be implemented with the docking module 32 disposed on any type of vehicle. In such embodiments, the docking module 32 is coupled to a second device 36 comprising an in-car video (ICV) camera 40 that is disposed in the vehicle 34. The ICV camera 40 is configured to record on-scene audio, video, or audiovisual data. The audio, video, and/or audiovisual data captured by the ICV camera 40 is stored on internal and/or removable storage media. In some embodiments, the ICV camera 40 is configured to temporarily hold the recorded audio, video, and/or audiovisual data in a buffer in a continuous circulating stream to perform "pre-event" circular buffering, without storing the data until triggered to store the data by a command signal or by manual user activation. Similar to the "smart buffering" feature provided by some embodiments of the first device 10 camera 12, this feature also provides a circular buffer that temporarily holds the captured data in configurable file segment sizes (e.g. 1-5 minute chunks) until the ICV camera 40 is activated to store the data to memory or the data is automatically deleted as new data is captured and streamed into the buffer in a continuous manner. When activated to store the data, time points are marked in the data files. In some embodiments, if the ICV camera 40 is activated or triggered to store the data, the ICV camera 40 can be configured to export the data (in the above-mentioned file segments) to the removable media and/or a separate folder in the memory sector where the circular recording is written. In some embodiments, the pre-event buffering can optionally be configured to continually write directly to memory in a circulating stream.

In operation, the first device 10 camera 12 can be used to record desired audio data (whether the audio is captured as audiovisual data or solely as audio data). In some situations, the ICV camera 40 will capture relevant audio data via a wired or wireless microphone source, while in some situations the ICV camera 40 may not (e.g., when the officer is outside of the vehicle 34 performing a traffic stop), and the first device 10 camera 12 may record the on-scene audio data when worn by the officer as a BWC. Thus, on-scene video data and audio data are obtained by both the ICV camera 40 and the first device 10 camera 12. However, separate playback of the recorded data files from the ICV camera 40 and the first device 10 camera 12 may not be in sync. This mismatch in synchronization may be particularly exacerbated when the ICV camera 40 and the first device 10 camera 12 are each activated at different times or intermittently during a recording event. The embodiments of this disclosure provide a solution in this situation.

Embodiments of the second device 36 are implemented with software configured to extract and/or multiplex the audio data recorded by the first device 10 with the file container of the data file(s) in the second device 36 memory (e.g. ICV camera 40). The data file(s) stored in the second device 36 may include audio, video, metadata, and/or audiovisual files. Some embodiments of the second device 36 are configured to multiplex the audio data recorded by the first device 10 to synchronize the audio data with the relevant data file(s) (i.e., audio data, video data, metadata, and/or audiovisual data) in the file container of the second device 36. It will be appreciated by those skilled in the art that data files (audio data, video data, metadata, and/or audiovisual data) can be multiplexed and synchronized with multiple devices 10, 36 and other audiovisual sources, and in some cases linked to several devices and/or sources, that were on the scene, for later synchronization. Such embodiments provide for enhanced audio and video data review and may also be used to identify and create a map of the location where the devices/sources were located during an event.

Figure 5:
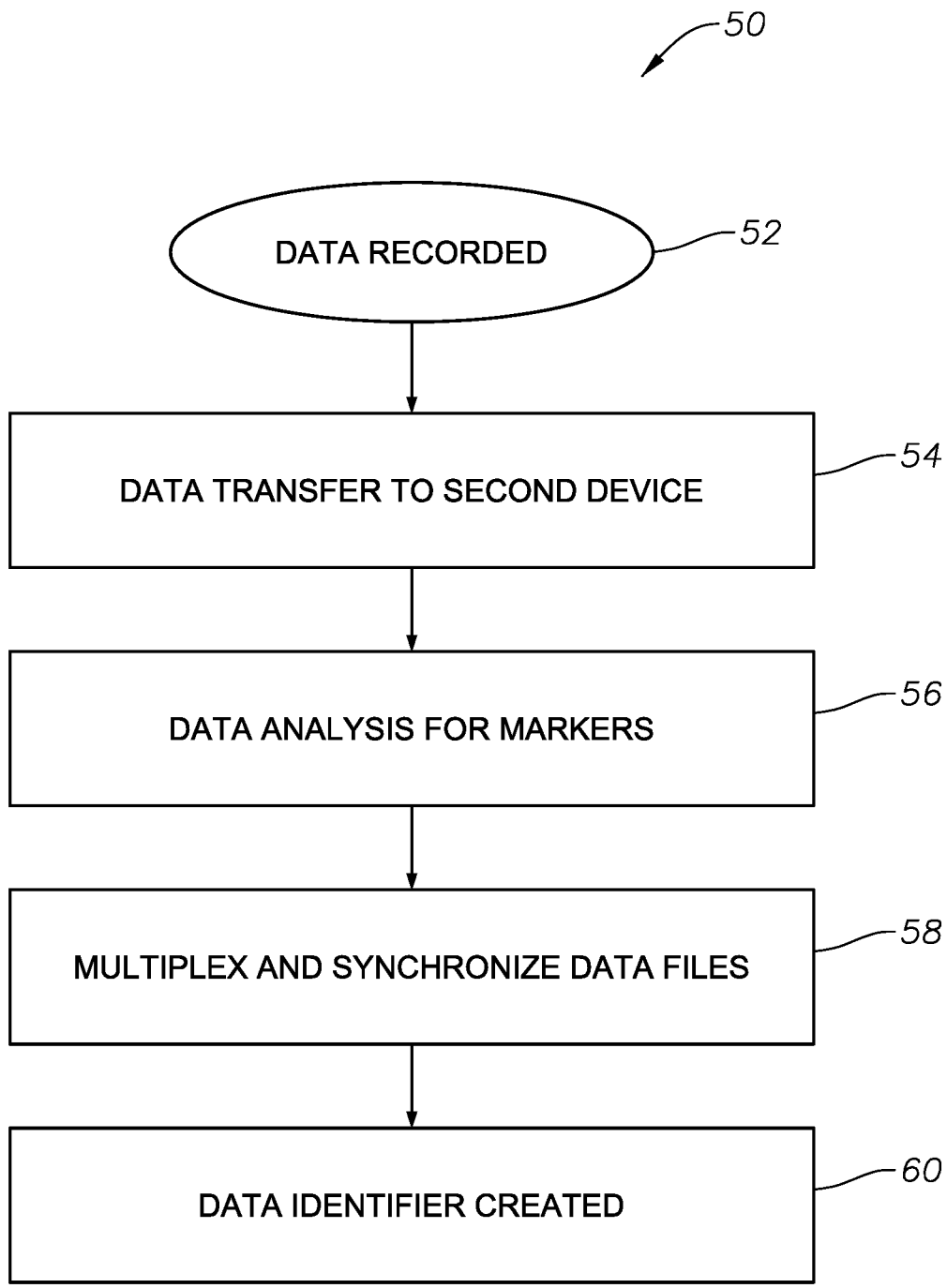
FIG. 5, in accordance with some embodiments of the present disclosure, depicts a processing flow chart for audio data processing.

FIG. 5 depicts a flow chart 50 of the audio data processing according to some embodiments of this disclosure. At module 52, as previously described, the first device 10 camera 12 records audio data. The audio data may be captured in an audiovisual recording or solely as an audio data recording. At module 54, the recorded audio data is uploaded or transferred to the second device 36 (e.g. ICV camera 40). In some embodiments, the docking module 32 is configured with POGO pins that mate with a receptacle in the first device 10 camera 12 to facilitate the data transfer between the camera 12 and the second device 36 when the camera 12 is docked in the docking module 32. In other embodiments, the first device 10 camera 12 is configured to wirelessly transfer the audio data file to the second device 36 using a conventional communication standard (e.g., RuBee, Wi-Fi, 3G, 4G, LTE, etc.). In yet other embodiments, the first device 10 camera 12 is configured for direct transfer of the audio data via a cable connection (e.g. a USB direct connect) with the second device 36. At module 56, the second device 36 analyzes the transferred audio data and one or more data files in the second device's 36 file container to search for and detect markers present in the respective data. For example, with embodiments wherein the second device 36 comprises an ICV camera 40, the camera processor is configured to execute instructions to analyze the audio data transferred from the first device 10 and the file container data file(s) (e.g., containing audio, video or audiovisual data) captured by ICV camera 40. The markers may consist of: the time stamps, a watermark, other metadata such as unit ID, officer ID, a unique identifier ("event identifier") for the recording event (e.g., DUI, speeding, etc.), GPS data, telemetry, etc. These markers may be automatically embedded in the respective recorded data and/or a separate XML file by the portable camera 12 and the ICV camera 40. Customized or event-specific markers (e.g., accident scene, DUI, etc.) can also be added to the data by the officer by (e.g., manual) entry via an ICV camera 40 touch display 42, a keyboard, a smartphone, or a tablet device. These added markers can be automatically associated with any device/file that is to be synchronized. Some portable camera 12 embodiments may also be configured with software to allow a user to add customized/event-specific markers to the camera 12 audio data file. In some embodiments, customized/event-specific markers may be preprogrammed and selectable via the programmable button or the aforementioned methods. Clock synchronization between the first device 10 and the second device 36 may be performed by the GPS circuitry/clock 28, by direct sync via the USB connection to the second device 36, or by sending real-time clock (RTC) sync signals similar to Network Time Protocol (NTP) time servers.

At module 58, once the markers have been detected in the respective data files, the audio data transferred from the first device 10 camera 12 is multiplexed and synchronized with the data file(s) in the second device ICV camera 40 file container. In some embodiments, the data files are multiplexed by linking the files together (via the software) such that opening or "playing" one file simultaneously opens/plays the linked file. In some embodiments, the synchronization is performed by: (a) selecting one of the data files (i.e., either the transferred audio data file or a data file in the ICV camera 40 file container); (b) rolling back in the selected file to a specific marker point (e.g. the earliest time mark); and (c) automatically synchronizing the files by marking points in the selected file where markers match with the data in the other data file. In an application, an officer can record the on-scene audio with the portable camera 12 affixed to his vest as a BWC. After the event is over, the officer can immediately transfer the audio data recorded with the camera 12 to the ICV camera 40, as described herein, or the officer can perform the data transfer at a later time (e.g. upon return to the station at the end of his shift). After the recorded audio data has been transferred from the camera 12 to the ICV camera 40 storage, the ICV camera 40 can roll back the transferred audio data to the proper time stamp and automatically multiplex and synchronize the data files by marking points in the transferred audio data where the markers match the data in the audiovisual file stored in the ICV camera 40. At module 60, the ICV camera 40 may create a unique identifier to identify the multiplexed data so that the synchronized data files can be logged in an audit trail and stored as desired. This way, when either data file is searched (i.e. the audio data recorded with the portable camera 12 or the data recorded with the ICV camera 40), the associated data file is automatically linked to be played back simultaneously and in sync if needed. Synchronous play from multiple data files can then be activated as desired. It will be appreciated by those skilled in the art that embodiments of this disclosure may be implemented using conventional software platforms and coding configured to perform the techniques and processes as disclosed herein.

In some embodiments where the first device 10 camera 12 and the ICV camera 40 are each configured to provide the "pre-event" circular buffering described above, the synchronization step of module 58 may be performed in a slightly different manner. With such embodiments, the selected data file that is rolled back (step (b) above) is the data file with the shortest recording time (duration). In other words, the selecting is performed based on comparing respective recording durations of (i) the audio data file transferred from the first device 10 camera 12 (BWC) and (ii) the at least one data file in the ICV camera. In this scenario the files may get synchronized starting points while maintaining the original starting points for each file. This ensures that the multiplexed data files are synced to the longest event of interest.

In some embodiments, the first device 10 is configured to simultaneously record and transmit audio data to the second device 36. The received audio transmission can be recorded in the second device 36 in real-time. For example, an embodiment of the first device 10 camera 12 could be used to record audio data as described herein, and simultaneously transmit (e.g., via RuBee, Wi-Fi, 3G, 4G, LTE, etc.) the audio data to a ICV camera 40. The ICV camera 40 can then store the transmitted audio data in the file container of the ICV camera 40 data file. Once stored in the ICV camera 40, the transmitted audio data may be multiplexed and synchronized with the data file(s) in the ICV camera 30 as disclosed herein.

In some embodiments, the audio data transferred from the first device 10 is used to replace audio data in a data file in the second device 36. For example, in a situation where the audio data captured by the ICV camera 40 is of such poor quality that it is difficult to discern (e.g. the audio signal goes faint as the officer walks away from the vehicle 34), the system software may be configured to automatically replace the poor-quality audio data in the data file from the ICV camera 40 with the audio data recorded by the first device 10. In some embodiments, only portions of audio data in the second device 36 data file are replaced in this manner. In other embodiments, the audio data transferred from the first device 10 is established as the audio data for the data file in the second device 36, such that when the multiplexed files are played, the only audio signal heard is that from the transferred audio data. For example, if the data file in the second device 36 contains only video data, without audio, the audio data recorded with first device 10 may be used as the audio data once the audio data is multiplexed into the file container of the second device data file. Other embodiments may combine and synchronize audio data captured by a separate body-worn source (e.g., a separate body-worn wireless microphone linked to the second device 36) with audio data from the first device 10, to produce a higher quality resultant audio file. Embodiments of this disclosure also encompass the multiplexing and synchronization of data (audio, video, audiovisual) obtained by multiple first devices 10 and/or second devices 36. Such embodiments provide for the synchronization of multiple audio data files to non-audio carrying video.

Although the examples presented above describe embodiments using a time stamp as a starting marker for the synchronization process, any marker or combination of markers in the data files may be used to synchronize the data sets.

It will also be appreciated by those skilled in the art having the benefit of this disclosure that embodiments may be implemented wherein the second device 36 that receives the recorded audio data from the first device 10 is a remote computer (e.g. a server at headquarters), a smartphone, a wearable device (e.g. another BWC), etc. Any of these second devices 36 may be implemented with electronics, microprocessors, and software configured to perform the techniques and processes disclosed herein. It will also be appreciated that the first device 10 may be, or include, a device configured to record and/or transmit audio data and metadata, and optionally video data.

Other embodiments may be implemented wherein the first device 10 is configured to create and store an audio track (i.e. containing solely a captured audio communication signal). The audio track can be created as a solely recorded file, i.e., without the creation of visual data, or simultaneously with creating and storing a separate audiovisual track, or non-simultaneously with creating and storing an audiovisual track. For example, an embodiment of the portable camera 12 can be configured to record an audiovisual data file of captured video and audio data, while simultaneously creating and storing a separate audio track containing only the captured audio data. In such embodiments, the markers (described above) may be automatically inserted in either or both of the audiovisual data file and the separate audio track. As another example, the portable camera 12 can be configured to create and store a separate audio track, containing only the captured audio data, at a later time after an audiovisual data file of captured video and audio data has been stored. Thus, camera 12 is configurable/operable to create/store/hold solely an audio track (file), solely a video data file, solely an audiovisual data file, or a combination thereof (such combination may be created simultaneously or non-simultaneously). With embodiments including an audio track, the transfer of only the recorded audio track (containing the audio data of interest) to the second device 36 is streamlined as audio signal data files typically entail less data and transfer at a faster rate (depending on system bandwidth) compared to audiovisual data. In all embodiments, the audio track can also be stored with automatically embedded markers (e.g., time stamp, watermark, metadata, unique identifier, GPS data, telemetry, etc.). In other embodiments, the first device 10 is configured to wirelessly transmit and stream (e.g., via the Internet, Cloud, radio network, Bluetooth, Wi-Fi, 3G, 4G, LTE, satellite, etc.) the captured audio data to a remote second device 36, in addition to recording the audio data to memory as described herein. The second device 36 is configured with a speaker to allow the received streamed audio data to be heard (e.g., in real-time or later), and the second device 36 is also operable to record the received streamed audio data to memory/storage (either or both of these functions, as desired). For example, for law enforcement applications this would allow an officer in the vehicle 34 to listen, in real-time, to the audio wirelessly streaming from his partner's BWC 12 and to manually select (e.g. by pushing a button) to record the data to the memory of the second device 36 (e.g., ICV camera 40). These features can be used as backup functions.

Among the benefits of the functionality provided by the disclosed embodiments is the elimination of the range-based limitations encountered by conventional wireless audio data transmission. Since on-scene audio of interest is recorded with the first device 10 and subsequently transferred from the first device to the second device 36, there are no longer any issues regarding wireless signal transfer range or signal interference. The embodiments also provide the ability to multiplex and/or synchronize the audio data files at a later time, after the video and/or audio files have been produced. In implementations where all files are transferred to a server, the multiplexing, synchronization, unique identifier coding, or a combination thereof, can be done at a later time as desired. For example, once the files are obtained, audio files from the first device 10 may be multiplexed and synced, or played separately yet in sync, with video files from the second device 36.

The recorded/stored/held data (audio, video, or audiovisual data) acquired by any device(s) can also be sent to the cloud in real-time, where the disclosed extraction, multiplexing, and/or synchronization techniques can be performed. For example, once uploaded to the cloud, audio data recorded by a first device 10 can be synchronized with the data file(s) (i.e., audio data, video data, metadata, and/or audiovisual data) uploaded to the cloud from a second device 36. Cloud processing can be performed concurrently with the disclosed techniques or as stand-alone processing of the data. Such cloud processing provides for rapid accessibility (e.g. by remote locations such as headquarters) and flexibility of scalability.

Figure 6:
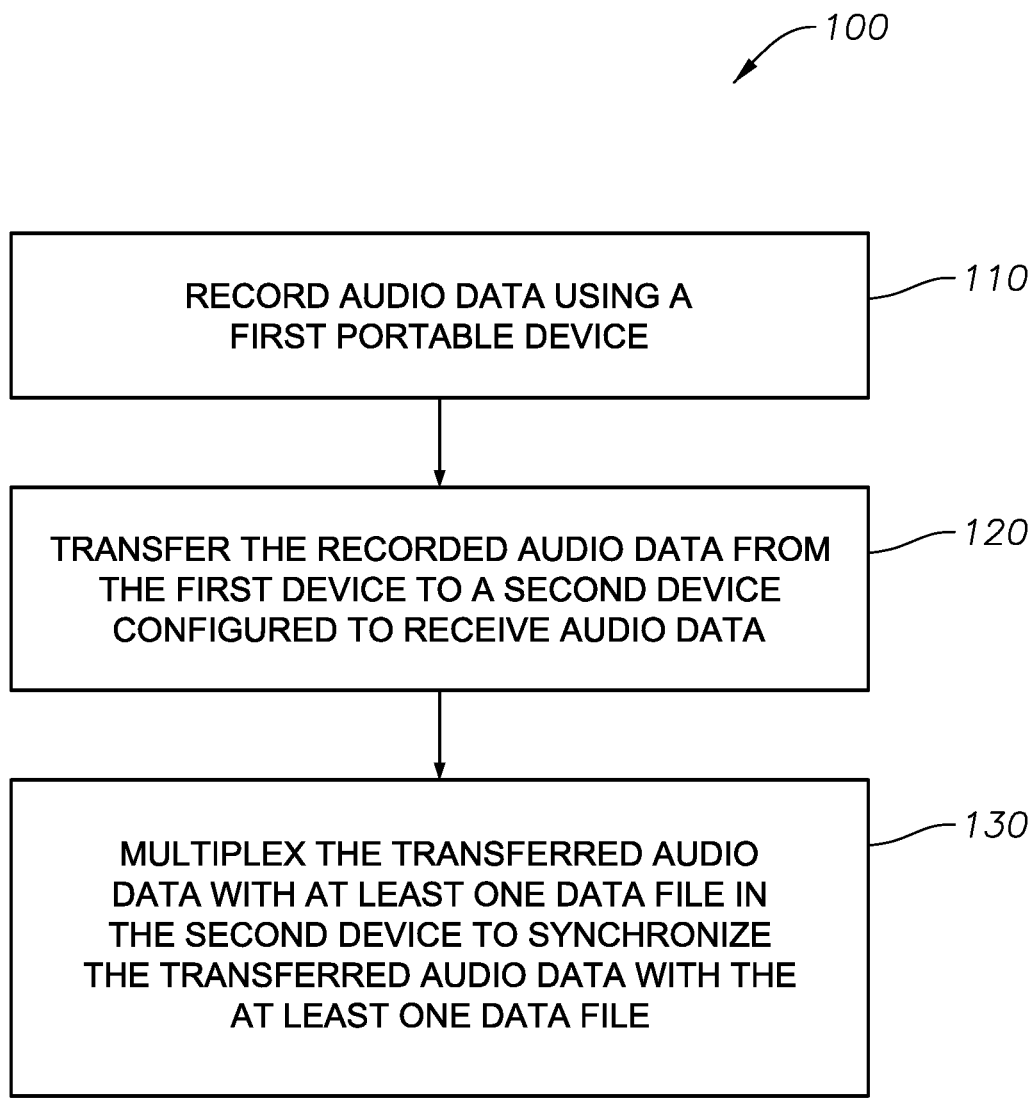
FIG. 6 is a flow chart depicting, at a top level, a method in accordance with some embodiments of the present disclosure.

FIG. 6 is a flow chart depicting a method 100 according to an embodiment of this disclosure. At step 110, audio data is recorded using a first device, wherein the first device is portable. The first device can be any of the devices as described herein. At step 120, the recorded audio data is transferred from the first device to a second device configured to receive audio data. The audio data can be transferred via any of the means disclosed herein. At step 130, the transferred audio data is multiplexed with at least one data file in the second device to synchronize the transferred audio data with the at least one data file. This method may be implemented using the techniques and embodiments disclosed herein.

In a variant of the embodiment depicted in FIG. 6, another embodiment entails the steps of method 100 and concurrently includes: uploading the audio data to the cloud, uploading the at least one data file from the second device to the cloud; and in the cloud, multiplexing the audio data with the at least one data file to synchronize the audio data with the at least one data file. The data processing may be performed by a virtual server in the cloud and the resultant file(s) may be stored in the same server or downloaded as desired.

Figure 7:
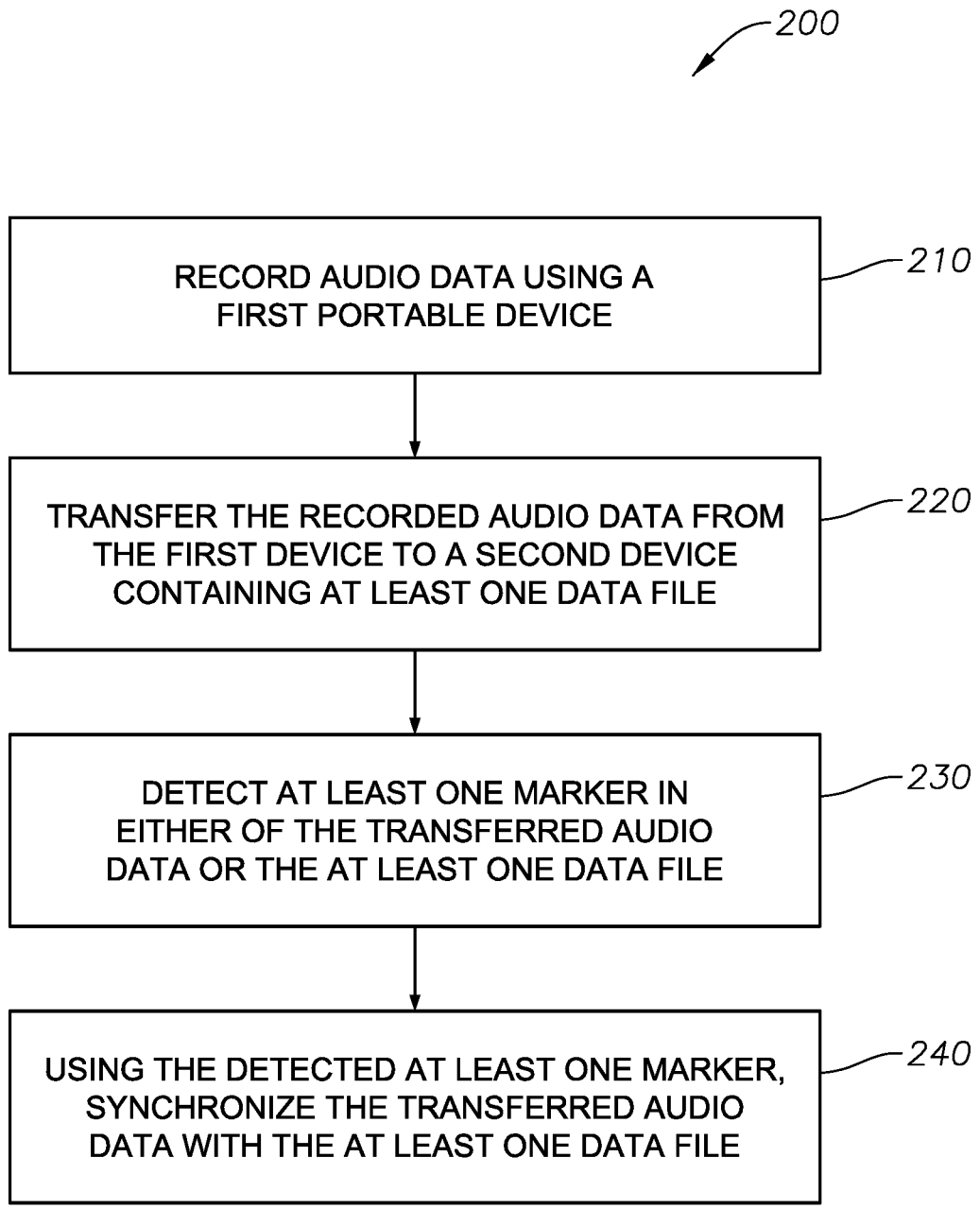
FIG. 7 is a flow chart depicting, at a top level, another method in accordance with some embodiments of the present disclosure.

FIG. 7 is a flow chart depicting a method 200 according to an embodiment of this disclosure. At step 210, audio data is recorded using a first device, wherein the first device is portable. The first device can be any of the devices as described herein. At step 220, the recorded audio data is transferred from the first device to a second device containing at least one data file. The audio data can be transferred via any of the means disclosed herein. At step 230, at least one marker is detected in either of the transferred audio data or the at least one data file. At step 240, using the detected marker(s), the transferred audio data is synchronized with the at least one data file. This method may be implemented using the techniques and embodiments disclosed herein.

Figure 8:
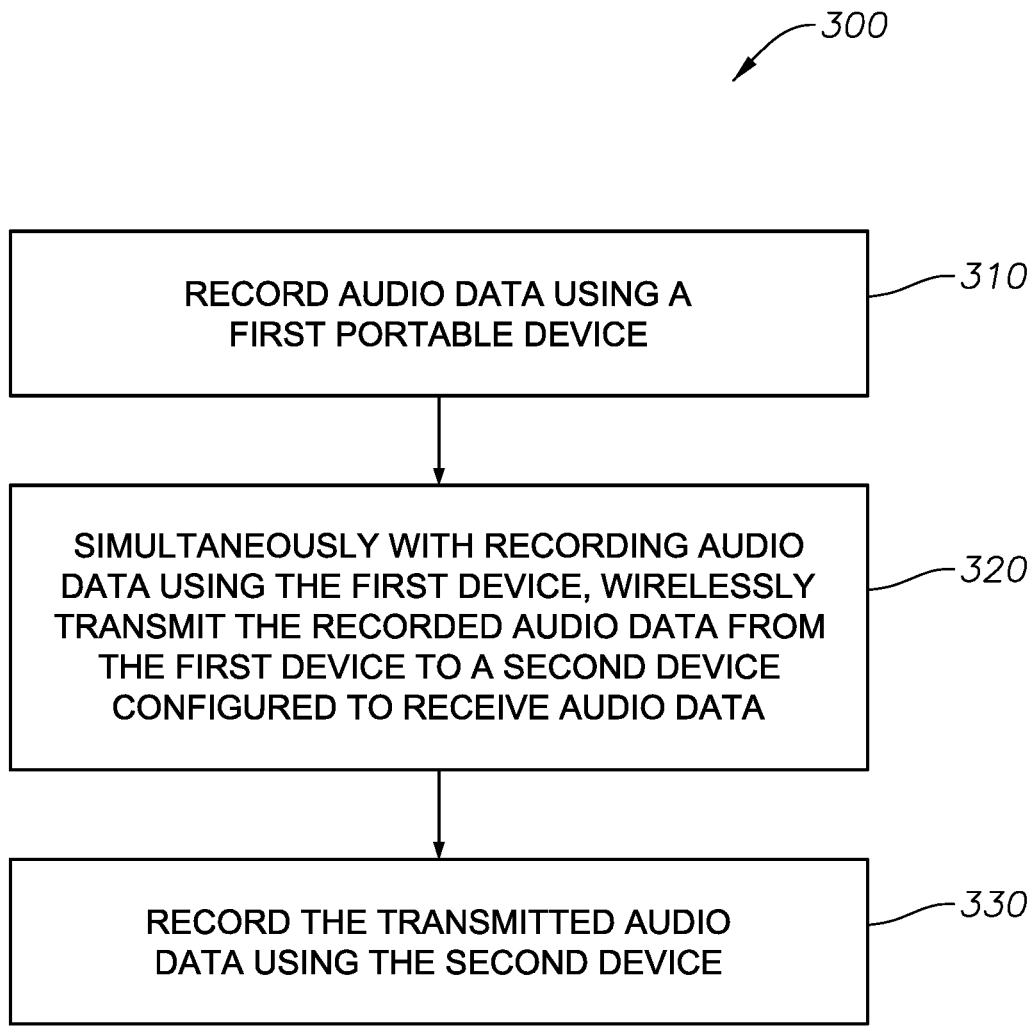
FIG. 8 is a flow chart depicting, at a top level, another method in accordance with some embodiments of the present disclosure.

FIG. 8 is a flow chart depicting a method 300 according to an embodiment of this disclosure. At step 310, audio data is recorded using a first device, wherein the first device is portable. The first device can be any of the devices as described herein. At step 320, simultaneously with the recording audio data using the first device, the recorded audio data from the first device is wirelessly transmitted to a second device configured to receive audio data. At step 330, the transmitted audio data is recorded using the second device. The audio data can be transmitted via any of the means disclosed herein. This method may be implemented using the techniques and embodiments disclosed herein.

With regard to FIGS. 6-8, any of the data files mentioned may include audio data, video data, or audiovisual data. Any of the data files may also include metadata. Similarly, with respect to FIGS. 6-8, the "audio data" mentioned may in fact be audio data, visual data, or audiovisual data, and it may also include metadata.

In light of the principles and example embodiments described and depicted herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered. This disclosure describes one or more embodiments wherein various operations are performed by certain systems, applications, modules, components, etc. In alternative embodiments, however, those operations could be performed by different components. Also, items such as applications, modules, components, etc., may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method, comprising:
   recording audio data using a first device comprising a body-worn camera (BWC);
   transferring the recorded audio data from the first device to a second device comprising an in-car video (ICV) camera and configured to receive audio data;
   multiplexing the transferred audio data with at least one data file contained in the second device;
   synchronizing the transferred audio data with the at least one data file; and
   creating an identifier associating the transferred audio data with the at least one data file;
   wherein the synchronizing the transferred audio data with the at least one data file comprises (a) selecting either the transferred audio data file or the at least one data file, (b) rolling back in time the selected file to a specific marker point, and (c) automatically synchronizing the transferred audio data file and the at least one data file by marking points in the selected file where markers in the selected file match with data in the file that was not selected; and
   wherein the selecting is performed based on comparing recording durations of the transferred audio data file and the at least one data file, the selected file being whichever of the transferred audio data file and the at least one data file has a shortest recording duration.

2. The method of claim 1, wherein the at least one data file comprises audiovisual data.

3. The method of claim 1, wherein the synchronizing the transferred audio data with the at least one data file comprises synchronizing the audio data using one or more markers selected from the group consisting of: (i) a time stamp; (ii) a watermark; (iii) an event identifier; (iv) GPS data; and (v) other metadata.

4. The method of claim 1, wherein the multiplexing the transferred audio data with the at least one data file comprises replacing audio data from the at least one data file with audio data from the transferred audio data.

5. The method of claim 1, wherein the multiplexing the transferred audio data with the at least one data file comprises establishing the transferred audio data as the audio data for the at least one data file.

6. The method of claim 1, wherein the recording audio data comprises creating a file in the first device containing visual data recorded by the first device and audio data recorded by the first device.

7. The method of claim 1, wherein the recording audio data comprises creating an audiovisual data file and a separate audio track of the audio data.

8. The method of claim 1, wherein the recording audio data comprises creating an audio track of the audio data.

9. The method of claim 8, wherein the audio track comprises one or more markers configured for use to synchronize audio data transferred from the audio track with the at least one data file.

10. The method of claim 9, wherein the markers are selected from the group consisting of: (i) a time stamp; (ii) a watermark; (iii) an event identifier; (iv) GPS data; and (v) other metadata.

11. The method of claim 1, further comprising wirelessly transmitting the recorded audio data to a remote device.

12. The method of claim 1, further comprising:
    uploading the audio data to the cloud;
    uploading the at least one data file from the second device to the cloud; and
    in the cloud, multiplexing the audio data with the at least one data file to synchronize the audio data with the at least one data file.

13. A system, comprising:
    a first device comprising a body-worn camera (BWC) configured to record audio data; and
    a second device comprising an in-car video (ICV) camera and configured to: (a) hold or store at least one data file, (b) receive audio data from the first device, (c) multiplex the audio data received from the first device with the at least one data file held or stored by the second device, and (d) synchronize the received audio data with the at least one data file held or stored by the second device, (e) and create an identifier associating the audio data received from the first device with the at least one data file held or stored by the second device;
    wherein the received audio data is synchronized with the at least one data file by: (a) selecting either the received audio data file or the at least one data file, (b) rolling back in time the selected file to a specific marker point, and (c) automatically synchronizing the received audio data file and the at least one data file by marking points in the selected file where markers in the selected file match with data in the file that was not selected; and
    wherein the selecting is performed based on comparing recording durations of the received audio data file and the at least one data file, the selected file being whichever of the received audio data file and the at least one data file has a shortest recording duration.

14. The system of claim 13, wherein the at least one data file held or stored by the second device comprises audiovisual data.

15. The system of claim 13, wherein the second device is configured to synchronize the audio data received from the first device with the at least one data file held or stored by the second device using one or more markers selected from the group consisting of: (i) a time stamp; (ii) a watermark; (iii) an event identifier; (iv) GPS data; and (v) other metadata.

16. The system of claim 13, wherein the second device is configured to multiplex the audio data received from the first device with the at least one data file held or stored by the second device to replace audio data from the at least one data file held or stored by the second device with audio data from the received audio data.

17. The system of claim 13, wherein the second device is configured to multiplex the audio data received from the first device with the at least one data file held or stored by the second device to establish the received audio data as the audio data for the at least one data file held or stored by the second device.

18. The system of claim 13, wherein the first device is configured to create a file containing visual data recorded by the first device and audio data recorded by the first device.

19. The system of claim 13, wherein the first device is configured to create an audiovisual data file and a separate audio track of the audio data recorded by the first device.

20. The system of claim 13, wherein the first device is configured to create an audio track of the audio data.

21. The system of claim 20, wherein the audio track comprises one or more markers configured for use to synchronize audio data transferred from the audio track with the at least one data file held or stored by the second device.

22. The system of claim 13, wherein the first device is configured to wirelessly transmit the recorded audio data to the second device or to another device.

23. A method, comprising:
recording audio data using a first device comprising a body-worn camera (BWC);
transferring the recorded audio data from the first device to a second device comprising an in-car video (ICV) camera and configured to receive audio data;
multiplexing the transferred audio data with at least one data file contained in the second device; and
synchronizing the transferred audio data with the at least one data file,
wherein the synchronizing the transferred audio data with the at least one data file comprises (a) selecting either the transferred audio data file or the at least one data file, (b) rolling back in time the selected file to a specific marker point, and (c) automatically synchronizing the transferred audio data file and the at least one data file by marking points in the selected file where markers in the selected file match with data in the file that was not selected, and
wherein the selecting is performed based on comparing recording durations of the transferred audio data file and the at least one data file, the selected file being whichever of the transferred audio data file and the at least one data file has a shortest recording duration.

24. A method, comprising:
recording audio data using a first device comprising a body-worn camera (BWC);
simultaneously with the recording audio data using the first device, wirelessly transmitting the audio data from the first device to a second device comprising an in-car video (ICV) camera and configured to receive audio data;
recording the transmitted audio data using the second device;
rendering the transmitted audio data audible using a speaker associated with the second device; and
synchronizing the transmitted audio data with at least one data file,
wherein the synchronizing the transmitted audio data with the at least one data file comprises (a) selecting either the transmitted audio data file or the at least one data file, (b) rolling back in time the selected file to a specific marker point, and (c) automatically synchronizing the transmitted audio data file and the at least one data file by marking points in the selected file where markers in the selected file match with data in the file that was not selected; and
wherein the selecting is performed based on comparing recording durations of the transmitted audio data file and the at least one data file, the selected file being whichever of the transmitted audio data file and the at least one data file has a shortest recording duration.

25. The method of claim 24, further comprising multiplexing the transmitted audio data with at least one data file contained in the second device to synchronize the transmitted audio data with the at least one data file.

26. The method of claim 25, wherein the synchronizing the transmitted audio data with the at least one data file comprises synchronizing the audio data using one or more markers selected from the group consisting of: (i) a time stamp; (ii) a watermark; (iii) an event identifier; (iv) GPS data; and (v) other metadata.

27. The method of claim 1, wherein the recording audio data comprises recording an audiovisual data file and a separate audio file of the audio data, the audiovisual data file comprising audio data and visual data.

28. The method of claim 1, wherein the first device and the second device were activated at respective different times to record the audio data and the at least one data file, respectively.

29. The system of claim 13, wherein the first device is configured to record an audiovisual data file and a separate audio file of the audio data, the audiovisual data file comprising audio data and visual data.

30. The system of claim 13, wherein the first device and the second device were activated at respective different times to record the audio data and the at least one data file, respectively.

* * * * *